United States Patent Office 2,875,184
Patented Feb. 24, 1959

2,875,184

POLYCHLOROPRENE CEMENT CURED WITH CARBON DISULFIDE, LOWER ALKYLAMINO-ALCOHOLS AND LOWER POLYALKYLAMINES

William E. Tann, Akron, Ohio, assignor to The Firestone Tire & Rubber Company, Akron, Ohio, a corporation of Ohio No Drawing. Application August 21, 1957
Serial No. 679,526

27 Claims. (Cl. 260—79.5)

This invention relates to improved neoprene (rubbery chloroprene polymer) cements and more particularly to vulcanizable neoprene cements containing a combination of stabilizing agents and vulcanization accelerators as specified herein. The term "cement" includes coatings, adhesives and dispersions wherein a chloroprene polymer is dissolved or dispersed in a non-aqueous solvent. This application is a continuation in part of my copending application Serial Number 350,751, now abandoned.

Neoprene air-curing adhesive cements, until the present invention, underwent great increases in viscosity to attain a gelled state during storage before use. This gelled state was due to cross-linking produced by curing agents, polymerization, oxygen or by mechanisms not completely understood. In any event, such a gelled state renders the neoprene cement entirely useless for bonding surfaces. Gelling of neoprene cement during storage has been avoided, before the present invention, by manufacturing the cement in two parts and storing each part separately. A non-vulcanizing, solvent base cement portion was formed of neoprene and modifying ingredients such as zinc oxide and carbon black dispersed in a solvent but without a vulcanization accelerator. The base cement portion and accelerator portion were stored separately until ultimate use, whereupon the base cement and the accelerator portion were mixed, and the resulting vulcanizable cement was applied immediately to the surfaces to be bonded. Such two-part cement is cumbersome to store, ship and use. Moreover, such cement is unsatisfactory particularly, because in the event that all of the vulcanizable adhesive is not used immediately after the accelerator is added, the portion not so used will gel in a matter of hours, and thus become unusable.

A proposal has been made to reduce the gelling tendency of neoprene cements by reducing the amount of vulcanization accelerator used therein. In order to form a satisfactory bond between two cemented surfaces, it is necessary to vulcanize the cement. However, the use of a less quantity of accelerator requires that the step of vulcanizing the cement be increased an undesirable length of time. Moreover, a reduction of the amount of accelerator in a cement reduces the strength of the vulcanized bond formed by such a cement.

Neoprene as used herein refers to polymers of chlorobutadiene as sold by the E. I. du Pont de Nemours & Company under that trade name.

The most successful of the prior art neoprene cements to resist gelling is compounded with a vulcanization accelerator combination of dibenzylamine and carbon disulfide. Such a cement is disclosed in U. S. Patent 2,514,192. This cement, although having some resistance to gelling for short periods of time, has a very slow rate of vulcanization and for that reason, is unsuitable for most applications.

An object of the present invention is to provide a neoprene cement which will not gel under normal conditions of storage but which has a rapid rate of vulcanization.

Another object of the invention is to provide a neoprene cement which forms a vulcanized bond of greater strength between two surfaces than has heretofore been possible.

A further object of the invention is to provide a neoprene cement resistant to gelling during storage, but capable of producing a stronger vulcanized bond between two surfaces in reduced vulcanization time.

A further specific object of the invention is to provide a neoprene cement which contains as an accelerator an aliphatic or cycloaliphatic amine, an amino-alcohol and carbon disulfide.

The amino-alcohol of the invention is preferably selected from the lower alkylamino-alcohols such as the ethanol amines which include monoethanolamine, diethanolamine and triethanolamine. Other satisfactory amino-alcohols are mono-propanolamine, dipropanolamine and tripropanolamine as well as mixtures of the propanolamines with each other and other amino-alcohols. Also useful are butanolamines such as isobutanolamine and other amino-alcohols such as 2-amino-2-methyl propanol. The amino-alcohol or mixture of amino-alcohols selected for the novel cement is mixed with carbon disulfide either before or after addition to the cement, as referred to later herein.

Another portion of the accelerator may be selected from the lower, secondary and tertiary aliphatic, cycloaliphatic or saturated heterocyclic amines as well as substituted derivatives thereof. Among the amines satisfactory for use in the invention are diamylamine, triamylamine, tributylamine, dibutylamine, propylamine, dipropylamine, tripropylamine, diethylamine, triethylamine, di-(2-ethyl hexyl) amine and dibenzylamine which behaves chemically as an alkyl amine. Also satisfactory are cyclohexylamine, dicyclohexylamine, benzyl-diethylamine, and tri-n-propylamine. The amino-alcohol and the secondary or tertiary amine may be mixed before being added to the cement or may be added to the cement singly as desired.

In one manner of preparing a cement of the invention neoprene is masticated on a two-roll mixing mill, and ingredients such as carbon black, antioxidant, and oils are added with continued mastication until a uniform dispersion of ingredients in the neoprene is obtained. The neoprene compound is removed from the mill and is dissolved by stirring in a suitable solvent such as toluene, until a cement of a concentration approximating one pound of neoprene compound for each gallon of cement is produced. The carbon disulfide, the amine and the amino alcohol are added to the toluene cement. Other methods of mixing are familiar to those skilled in the art of manufacturing solvent cements and will produce satisfactory results. Therefore, it is not intended to limit the invention to the method set forth above.

Among the known solvents useful for neoprene cements are aromatic solvents such as benzene, toluene, xylene and their homologues; ethylene dichloride, trichloroethylene and other chlorinated hydrocarbon solvents; ester solvents, such as amyl acetate, butyl formate, butyl acetate, ethyl acetate and ethyl propionate; ketones such as methyl ethyl ketone, isophorone and the like; mixtures of any of the above solvents with each other or with gasoline or the like; and commercial mixed solvents for neoprene known to the art.

In order to test the cements of the invention, tests were made according to the following specifications:

OVEN TESTS

A container holding a sample of the cement to be tested is placed in an atmosphere of hot air at 158° F. or at room temperature (approximately 75° F.), and the time required for the appearance of a solid gel formation in the cement is recorded.

DEAD WEIGHT TEST

The surfaces of two strips of rubberized fabric 12 x 4¼ inches are cleaned with an aromatic solvent and a margin of at least ¾ of an inch along one long edge of each strip is cemented with the neoprene adhesive to be tested. The adhesive is allowed to dry and a second adhesive coat is applied and also allowed to dry. The two strips of fabric are pressed together to form a ¾ inch overlapping seam which is rolled out with a roller stitcher to produce intimate contact of the cemented surfaces and to expel air bubbles. The seams thus formed are air-cured at a desired temperature for the length of time of the test. Sample specimens two inches in width are cut at right angles to the seam. The test specimen is placed in an atmosphere of hot air at 140° F. and gripped parallel to the seam with self-aligning grips. A load is applied to the grips normal to the seam at a rate of 30 pounds per minute in an attempt to pull the seam apart. Results are reported in pounds of load and in time in minutes and seconds required for separation of the seam.

Standard specification requires an air drying adhesive to cure within ten days and to have a minimum strength of dead weight test of 60 lbs. when tested at 140° F.

To carry out the invention, a base stock was mixed on a two-roll mill according to the following formula:

| | Parts by weight |
|---|---|
| Polychlorobutadiene rubber (neoprene) [1] | 100.00 |
| Carbon black | 3.00 |
| Antioxidant | 2.00 |
| | 105.00 |

[1] Neoprene CG was used but neoprene AC, neoprene GN, neoprene KN, KNR and other types are acceptable.

The mixed stock was dispersed in toluene to make a base cement with a total solids concentration of approximately 10% by weight. To this base cement, various amounts of ingredients were added and dispersed, and the resulting cements were tested in the oven test and dead weight test, all samples being air-cured at room temperature. The added ingredients and test results are given in Table I.

In Table I and in the following tables, all parts are by weight based upon 100 parts of neoprene in each cement.

Table I

| | Control Cement | Sample No. | | | | | | |
|---|---|---|---|---|---|---|---|---|
| | | 1 | 2 | 3 | 4 | 5 | 6 | 7 |
| Monoethanolamine | | 3.66 | 3.66 | 3.66 | 3.66 | 3.66 | 3.66 | 3.66 |
| Dibenzylamine | 6.16 | 6.16 | 6.16 | 4.88 | 3.70 | 3.70 | 6.16 | 3.70 |
| Diethylamine | | 1.70 | 3.40 | 3.40 | 3.40 | 2.55 | 1.70 | 2.55 |
| Zinc Butylxanthate | | 6.00 | 6.00 | 4.78 | 3.58 | 3.58 | 6.40 | 3.58 |
| Carbon Disulfide | 14.00 | 22.6 | 22.6 | 15.0 | 11.30 | 11.30 | 37.6 | 22.6 |
| Dead Wt. Test (48 hr. cure): | | | | | | | | |
| Pounds | 20 | 76 | 80 | 54 | 58 | 72 | 74 | 94 |
| Time— | | | | | | | | |
| Min | 0 | 2 | 2 | 1 | 2 | 2 | 2 | 2 |
| Sec | 40 | 32 | 40 | 52 | 0 | 35 | 22 | 55 |
| Time to gel, 158° F., Oven | 6 hrs. | No Test Run | No Test Run | No Test Run | No Test Run | No Test Run | 2 Days | 21 Days |

Cements incorporating the novel accelerators and stabilizers as shown by Table I had gelling resistance superior to the prior art control cement and also were faster curing.

Improved results over the prior art are also obtained upon substituting other amino-alcohols for monoethanolamine. The cements shown in Table II were prepared in the manner previously described and were tested with the improved results shown.

Table II

| | Sample No. | | | | |
|---|---|---|---|---|---|
| | 8 | 9 | 10 | 11 | 12 |
| Monoethanolamine | 3.66 | | | | |
| Dibenzylamine | 3.70 | 3.70 | 3.70 | 3.70 | 3.70 |
| Diethylamine | 2.55 | 2.55 | 2.55 | 2.55 | 2.55 |
| Zinc Butylxanthate | 3.58 | 3.58 | 3.58 | 3.58 | 3.58 |
| Carbon Disulfide | 37.6 | 37.6 | 37.6 | 37.6 | 37.6 |
| Diethanolamine | | 6.28 | | | |
| Triethanolamine | | | 8.92 | | |
| Isobutanolamine | | | | 5.32 | |
| 2-amino-2-methylpropanol | | | | | 5.32 |
| Dead Wt. Test (Sample cured 10 days at 75° F.): | | | | | |
| Pounds | 76 | 95 | 74 | 136 | 50 |
| Time— | | | | | |
| Min | 2 | 3 | 2 | 5 | 1 |
| Sec | 22 | 0 | + | + | 56 |
| Days to gel in 158° F., Oven | 18 | 11 | 11 | 11 | 11 |

The amino-alcohols substituted for monoethanolamine in the cements of Table II gave adhesives with improved resistance to gelling and improved rate of vulcanization characteristics over the prior art adhesives, but the amino-alcohols shown are given as examples only and the invention is not intended to be limited thereto.

The advantages of the invention are found also when the reaction products of the various amines with carbon disulfide are substituted for the amines themselves.

An indication of the degree of improvement obtained by use of an excess of carbon disulfide in the cement with the reaction products of the amines of the invention with carbon disulfide is seen by reference to Table III.

Cements 19 to 25 inclusive using accelerators of the above concentration were mixed as previously described and tested with results as indicated. These cements proved to be superior to prior art cements.

Tertiary amines alone or mixed with themselves or other amines may be combined with carbon disulfide and an amino alcohol to obtain the advantages of the invention.

*Table III*

|  | Sample No. | | | | | |
|---|---|---|---|---|---|---|
|  | 13 | 14 | 15 | 16 | 17 | 18 |
| Zinc Butylxanthate | 3.58 | 3.58 | 3.58 | 3.58 | 3.58 | 3.58 |
| Dibenzylamine |  |  | 1.85 | 1.85 |  |  |
| Diethylamine |  |  |  |  | 1.27 | 1.27 |
| Monoethanolamine |  |  |  |  |  |  |
| Carbon Disulfide |  | 22.6 |  | 22.6 |  | 22.6 |
| Diethylammonium Diethyldithiocarbamate | 6.64 | 6.64 | 6.64 | 6.64 | 6.64 | 6.64 |
| Monoethanolammonium Ethanoldithiocarbamate | 5.92 | 5.92 | 5.92 | 5.92 | 5.92 | 5.92 |
| Dead Wt. Test (Cured 20 hrs. at 75° F.): |  |  |  |  |  |  |
| Pounds | 42 | 46 | 40 | 56 | 46 | 59 |
| Time— |  |  |  |  |  |  |
| Min | 1 | 1 | 1 | 1 | 1 | 1 |
| Sec | 12 | 18 | 6 | 42 | 18 | 54 |
| Days to gel in 158° F., Oven | 9 | 4 | 7 | 11 | No gel, 70 days | 9 |

The cements listed in Table III were mixed in the prescribed manner and tested. The results indicate that the novel accelerator-stabilizer combination permits the use of the reaction products of the amines and carbon disulfides as well as with increased amounts of carbon disulfide to give a stronger vulcanized bond with little loss in gelling resistance. All of the cements of Table III show either improved cure or improved gelling resistance over the prior art neoprene cements.

The invention is workable with concentrations of carbon disulfide over a wide range based on the neoprene content of the cement. Table IV lists cements tested showing the effects of varying the concentration of carbon disulfide while maintaining the concentration of the other accelerators constant.

*Table V*

|  | Sample No. | | | |
|---|---|---|---|---|
|  | 26 | 27 | 28 | 29 |
| Dibenzylamine | 6.12 |  |  |  |
| Diethylamine | 3.67 |  |  |  |
| Monoethanolamine | 3.67 | 3.67 | 3.67 | 3.67 |
| Carbon Disulfide | 22.4 | 22.4 | 22.4 | 22.4 |
| Benzyldiethylamine |  | 4.25 |  |  |
| Tri-n-propylamine |  |  | 5.81 |  |
| Triethylamine |  |  |  | 4.36 |
| Dead Wt. Test (Sample cured 48 hrs. at 75° F.): |  |  |  |  |
| Pounds | 140 | 82 | 74 | 66 |
| Time— |  |  |  |  |
| Min | 5 | 2 | 2 | 2 |
| Sec | 0 | 44 | 28 | 12 |
| Days to gel in 158° F., Oven |  | 6 | 6 |  |

*Table IV*

|  | Sample No. | | | | | | |
|---|---|---|---|---|---|---|---|
|  | 19 | 20 | 21 | 22 | 23 | 24 | 25 |
| Zinc Butylxanthate | 2.52 | 2.52 | 2.52 | 2.52 | 2.52 | 2.52 | 2.52 |
| Dibenzylamine | 2.60 | 2.60 | 2.60 | 2.60 | 2.60 | 2.60 | 2.60 |
| Diethylamine | 1.19 | 1.19 | 1.19 | 1.19 | 1.19 | 1.19 | 1.19 |
| Monoethanolamine | 2.56 | 2.56 | 2.56 | 2.56 | 2.56 | 2.56 | 2.56 |
| Carbon Disulfide | 2.10 | 3.96 | 7.92 | 15.90 | 23.80 | 26.40 | 31.80 |
| Dead Wt. Test (Cured 20 hrs. at 75° F.): |  |  |  |  |  |  |  |
| Pounds |  | 51 | 50 | 47 | 43 | 64 | 47 |
| Time— |  |  |  |  |  |  |  |
| Min |  | 1 | 1 | 1 | 1 | 2 | 1 |
| Sec |  | 42 | 40 | 34 | 26 | 8 | 34 |
| Days to gel in 158° F., Oven |  | 10 | 44 | 5 | 10 | 23 | 6 |

All of the above cements when tested were better than the prior art cements in rate of cure or gel resistance.

In addition to the use of aliphatic amines in the cement of the invention the use of cycloaliphatic amines singly or in mixture with other amines is possible as is shown by Table VI.

*Table VI*

|  | Sample No. | | |
|---|---|---|---|
|  | 30 | 31 | 32 |
| Dibenzylamine | 6.12 | | |
| Diethylamine | 3.67 | 3.67 | 3.67 |
| Monoethanolamine | 3.67 | | |
| Carbon Disulfide | 22.4 | 22.4 | 22.4 |
| Cyclohexylamine |  | 4.67 |  |
| Dicyclohexylamine |  |  | 5.57 |
| Dead Wt. Test (Sample cured 48 hrs. at 75° F.): | | | |
| Pounds | 140 | 95 | 66 |
| Time— | | | |
| Min | 5 | 3 | 2 |
| Sec | 0 | 10 | 12 |
| Days to gel in 158° F., Oven |  | 4 |  |

Cements compounded with accelerators containing cyclohexylamine and dicyclohexylamine show rate of cure, gel and bonding characteristics superior to prior art cements.

Other examples of amines suitable for substitution for dibenzylamine or diethylamine in the invention are listed in the following table:

*Table VII*

|  | Sample No. | | | | | | | |
|---|---|---|---|---|---|---|---|---|
|  | 33 | 34 | 35 | 36 | 37 | 38 | 39 | 40 |
| Zinc butylxanthate | 6.4 | 6.4 | 6.4 | 6.4 | 6.4 | 6.4 | 6.4 | 6.4 |
| Dibenzylamine | 6.2 | 6.2 | 6.2 | 6.2 | 6.2 | 6.2 | 6.2 | 6.2 |
| Diethylamine | 3.7 | 3.7 | 3.7 | 3.7 | 3.7 | 3.7 | 3.7 | 3.7 |
| Monoethanolamine |  | 37.6 | 37.6 | 37.6 | 37.6 | 22.6 | 22.6 | 22.6 |
| Carbon Disulfide |  |  |  |  |  |  | 4.4 | 7.3 |
| Diisopropylamine | 4.1 |  |  |  |  |  |  |  |
| Di-n-butylamine |  | 3.90 |  |  |  |  |  |  |
| T-butylamine |  |  | 2.20 |  |  |  |  |  |
| Di-n-amylamine |  |  |  | 4.70 |  |  |  |  |
| Di-(2-ethylhexyl)amine |  |  |  |  | 7.22 |  |  |  |
| Dimethylamine |  |  |  |  |  | 1.34 |  |  |
| Dead Wt. Test (Sample cured 48 hrs. at 75° F.): | | | | | | | | |
| Pounds | 84 | 67 | 84 | 92 | 66 | 84 | 98 | 80 |
| Time— | | | | | | | | |
| Min | 2 | 1 | 2 | 2 | 1 | 2 | 3 | 2 |
| Sec | 24 | 48 | 18 | 36 | 42 | 18 | 16 | 40 |
| Days to gel in 158° F., Oven | 8 | 8 | 4 | 6 | 8 | 9 | 8 | 17 |

The above listed samples were prepared using the base cement and tested as indicated. All of the above cements showed properties superior to the prior art.

The reaction products of amines other than diethylamine and dibenzylamine will function satisfactorily in a cement of the invention as shown by the following table:

*Table VIII*

|  | Sample No. | | |
|---|---|---|---|
|  | 41 | 42 | 43 |
| Zinc Butylxanthate | 3.58 | 3.58 | 3.58 |
| Dibenzylamine | 3.7 |  |  |
| Monoethanolamine | 3.66 |  |  |
| Di-isopropylamine | 4.4 |  |  |
| Carbon Disulfide | 22.6 |  |  |
| Diisopropylammonium-Diisopropyldithiocarbamate |  | 8.32 |  |
| Dimethylammonium-Dimethyldithiocarbamate |  |  | 4.97 |
| Monoethanolammonium ethanoldithiocarbamate |  | 5.93 | 5.93 |
| Dead Wt. Test (Sample cured 20 hrs. at 75° F.): | | | |
| Pounds | 98 | 65 | 66 |
| Time— | | | |
| Min | 3 | 2 | 2 |
| Sec | 16 | 10 | 11 |
| Days to gel in 158° F., Oven | 8 | 13 | 13 |

These cements were prepared from the base cement as previously described and exhibited properties superior to the prior art neoprene cements.

Only relatively small proportions of the amino alcohol and of the alkylamine, based upon the neoprene content of the cements of the invention, are required. To gain the advantages of the invention, the aliphatic and cycloaliphatic amines are present preferably in amounts from 1-5% by weight on the neoprene while up to 30% and more will give the advantages of the invention. The amino-alcohol is employed in quantities of 20% or more on the same basis with a range of 1-5% preferred. The actual amounts of these amines utilized, are in line with the amounts of vulcanization accelerators normally employed in neoprene cements. As is indicated above, carbon disulfide could be included in the cement with the amino alcohol and amine, in a sufficient amount to form appreciable quantities of the dithiocarbamate reaction products. Alternatively, as is brought out above, free carbon disulfide is unnecessary in cement when the carbon disulfide reaction products of the amino-alcohol and the alkylamine are utilized.

The wide range of use of the accelerator in the preferred form of the invention is shown by the following tests:

Table IX

| | Sample No. | | | | | | |
|---|---|---|---|---|---|---|---|
| | 44 | 45 | 46 | 47 | 48 | 49 | 50 |
| Zincbutylxanthate | 4.3 | 4.3 | 4.3 | 4.3 | 4.3 | 4.3 | 4.3 |
| Dibenzylamine | 2.46 | 4.92 | 7.38 | 9.84 | 12.3 | 14.76 | 17.22 |
| Monoethanolamine | 2.44 | 4.88 | 7.32 | 9.76 | 12.2 | 14.64 | 17.08 |
| Diethylamine | 1.70 | 3.40 | 5.10 | 6.80 | 8.5 | 10.2 | 11.9 |
| Carbon disulfide | 15.9 | 15.9 | 15.9 | 15.9 | 15.9 | 15.9 | 15.9 |
| Dead Weight @ 140° F.; Aged 20 hrs. @ 75° F.: | | | | | | | |
| Pounds | 18 | 44 | 67 | 34 | 32 | 20 | 13 |
| Time— | | | | | | | |
| Min | 0 | 1 | 2 | 1 | 1 | 0 | 0 |
| Sec | 37 | 27 | 14 | 9 | 4 | 39 | 25 |
| Gel Test | No gel | No gel | No gel | No gel | No gel | No gel | No gel |
| Days in 158° F., Oven | 10 | 10 | 10 | 10 | 10 | 10 | 10 |

It will be seen that all reasonable quantities of the novel accelerator of the preferred form of the invention reacting to give gel time and dead weight tests superior to the prior art cement shown in sample 6. It is apparent that the amounts of the accelerators used are relatively small as compared to the amount of neoprene present and in the terms of the rubber compounder the accelerator is used in "relatively small proportions" in the neoprene cement.

What is claimed is:

1. A vulcanizing cement containing a rubbery polychloroprene, a solvent for said polymer and as an accelerator, relatively small amounts of carbon disulfide, a lower alkylamino-alcohol, and at least one lower polyalkylamine selected from the group consisting of lower aliphatic amines and lower cycloaliphatic amines.

2. A vulcanizing cement containing a rubbery polychloroprene, a solvent for said polymer and as an accelerator, relatively small quantities of carbon disulfide, an ethanolamine and at least one lower polyalkylamine selected from the group consisting of lower aliphatic amines and lower cycloaliphatic amines.

3. A vulcanizing cement according to claim 2 wherein the ethanolamine is a monoethanolamine.

4. A vulcanizing cement according to claim 2 wherein the ethanolamine is a diethanolamine.

5. A vulcanizing cement according to claim 2 wherein the ethanolamine is a triethanolamine.

6. A vulcanizing cement according to claim 1 wherein the lower alkylamino alcohol is isobutanolamine.

7. A vulcanizing cement according to claim 1 wherein the lower alkylamino alcohol is 2-amino-2-methylpropanol.

8. A vulcanizing cement containing a rubbery polychloroprene, a solvent for said polymer and as an accelerator relatively small quantities of carbon disulfide, an ethanolamine and at least one lower polyalkylamine.

9. A vulcanizing cement according to claim 8 wherein the lower polyalkylamine is a polyethylamine.

10. A vulcanizing cement according to claim 8 wherein the lower polyalkylamine is dibenzylamine.

11. A vulcanizing cement according to claim 8 wherein the lower polyalkylamine is a polypropylamine.

12. A vulcanizing cement according to claim 8 wherein the lower polyalkylamine is a polybutylamine.

13. A vulcanizing cement according to claim 8 wherein the lower polyalkylamine is a polyamylamine.

14. A vulcanizing cement containing a rubbery polychloroprene polymer, a solvent for said polymer and as an accelerator, relatively small amounts of carbon disulfide, an ethanolamine and a cycloaliphatic amine.

15. A vulcanizing cement according to claim 12 wherein the cycloaliphatic amine is dicyclohexylamine.

16. A vulcanizing cement containing a rubbery polychloroprene, a solvent for said polymer and as an accelerator relatively small amounts of an ethanolamine and at least two polyalkylamines.

17. A vulcanizing cement according to claim 14 wherein the polyalkylamines are diethylamine and dibenzylamine.

18. A vulcanizing cement according to claim 14 wherein the polyalkylamines are dibenzylamine and diisopropylamine.

19. A vulcanizing cement according to claim 14 wherein the polyalkylamines are dibenzylamine and di-n-butylamine.

20. A vulcanizing cement according to claim 14 wherein the polyalkylamines are dibenzylamine and T-butylamine.

21. A vulcanizing cement according to claim 14 wherein the polyalkylamines are dibenzylamine and di-(2-ethylhexyl) amine.

22. A method of preparing a quick-curing rubbery polychloroprene cement comprising the steps of dissolving rubbery polychloroprene in a solvent and adding as an accelerator relatively small proportions of carbon disulfide, a lower alkylamino-alcohol and at least one lower polyalkylamine selected from the group consisting of aliphatic and cycloaliphatic amines.

23. A method of preparing a quick-curing rubbery polychloroprene cement comprising the steps of dissolving the rubbery polychloroprene in a solvent and adding as an accelerator relatively small amounts of carbon disulfide, an ethanolamine and at least one lower polyalkylamine.

24. A method of preparing a quick-curing rubbery polychloroprene cement comprising the steps of dissolving the rubbery polychloroprene in a solvent and adding as an accelerator relatively small amounts of carbon disulfide, an ethanolamine, diethylamine and dibenzylamine.

25. A method of preparing a quick-curing rubbery polychloroprene cement comprising the steps of dissolving the rubbery polychloroprene in a solvent and adding as an accelerator not over 32 parts of carbon disulfide, not over 20 parts of an ethanolamine, not over 15 parts of dibenzylamine, and not over 7.5 parts of diethylamine.

26. A method of preparing a rubbery polychloroprene cement according to claim 24 wherein the ingredients of the accelerator are mixed together before being added to the cement.

27. A method of preparing a rubbery polychloroprene cement according to claim 25 wherein the ingredients of the accelerator are mixed together before being added to the cement.

References Cited in the file of this patent

UNITED STATES PATENTS

| 2,163,611 | MacDonald | June 27, 1939 |
| 2,340,650 | Dean | Feb. 1, 1944 |
| 2,514,192 | Tann | July 4, 1950 |

UNITED STATES PATENT OFFICE
CERTIFICATE OF CORRECTION

Patent No. 2,875,184

February 24, 1959

William E. Tann

It is hereby certified that error appears in the printed specification of the above numbered patent requiring correction and that the said Letters Patent should read as corrected below.

Columns 3 and 4, Table I, eighth column thereof, under Sample No. 6, next to last line, for the figure "2" read -- 21 --.

Signed and sealed this 21st day of July 1959.

(SEAL)
Attest:
KARL H. AXLINE
Attesting Officer

ROBERT C. WATSON
Commissioner of Patents